Patented Feb. 2, 1954

2,668,166

UNITED STATES PATENT OFFICE 2,668,166

DIAZONIUM COMPOUNDS

Wilhelm Seidenfaden and Hans Albert, Offenbach am Main, Germany

No Drawing. Application September 4, 1951, Serial No. 245,078

Claims priority, application Germany September 5, 1950

5 Claims. (Cl. 260—141)

This invention relates to new diazonium compounds and to a process for the manufacture of diazonium compounds made from amino-azo compounds.

It is an object of this invention to provide for a process for the preparation of such diazonium compounds which are more readily soluble in water than the hitherto known diazonium compounds made from amino-azo compounds.

It is another object of this invention to provide for a process for diazotizing amino-azo compounds by using acids of a considerably lower concentration than the concentrations hitherto necessary for diazotizing amino-azo compounds of the type used up to now for the preparation of such diazonium compounds.

This invention relates to the preparation of diazonium compounds made from amino-azo compounds of the following general formula:

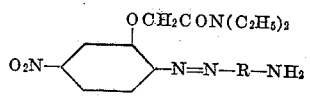

wherein R stands for an aryl radical of the group consisting of benzene and naphthalene at least one hydrogen atom of said radical being substituted by a substituent of the group consisting of $-OH, -CH_3, -OCH_3, -OCH_2CON(C_2H_5)_2$.

This invention more particularly relates to the preparation of diazonium compounds made from amino-azo compounds of the following general formula:

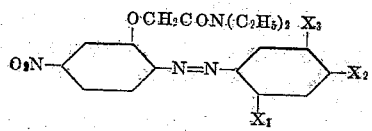

wherein one of the substituents $X_1$ and $X_2$ stands for $NH_2$, the other standing for a substituent of the group consisting of —

$-OCH_3$ and $-OCH_2CON(C_2H_5)_2$, and $X_3$ stands for a substituent of the group consisting of $-CH_3$ and $-OCH_3$.

It is known to use as components for the manufacture of azo dyestuffs amino-azo compounds of the following general formula:

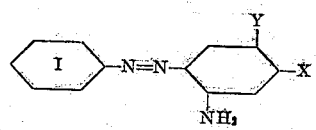

wherein X stands for alkoxy, Y for alkyl, alkoxy or halogen and wherein the benzene nucleus I may contain substituents. These compounds can be diazotized only under energetic conditions, and the diazonium compounds so obtained are always of relatively low solubility.

In order to diazotize such bases it is necessary to work in highly concentrated hydrochloric or sulphuric acid or with the addition of solution promotors such, for example, as acetic acid. These methods necessitate the use of special measures, such as the removal of gases, for example hydrogen chloride gas, which are injurious to health and strongly corrosive, or the protection of the apparatus against the attack of concentrated sulphuric acid or nitrosyl-sulphuric acid, so that the process is not suitable for general application and is hardly economical.

Furthermore, in many cases the low solubility of the diazonium compounds renders difficult their extensive application for the production of dyestuffs on the fibre, for example, as supplementary additions in working with standing baths or for the production of strong developing solutions such as are used in printing for producing deep tints.

Now we have found that amino-azo compounds of the following general formula:

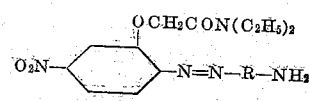

wherein R stands for an aryl radical of the group consisting of benzene and naphthalene at least one hydrogen atom of said radical being substituted by a substituent of the group consisting of $-OH, -CH_3, -OCH_3, -OCH_2CON(C_2H_5)_2$, can be diazotized already with moderately concentrated mineral acids, especially with hydrochloric acid, or with sulphuric acid or nitric acid.

For instance, hydrochloric acid may be used for diazotizing the said bases in such concentrations which do not evolve hydrogen chloride gas at ordinary temperature, i. e. having a content of about 15 to 20 per cent of HCl. Sulfuric acid, for instance, may be used in concentrations up to 75 or 80 per cent of $H_2SO_4$.

It is evident that this possibility to carry out the diazotization process with acids of considerably lower concentrations than hitherto used for diazotizing comparable amino-azo compounds, enables the diazotization to be made more economically and commercially with greater ease.

Besides, the diazonium compounds made from the new bases are more easily soluble than those which contain an alkoxy group instead of the dialkylamino substituted oxyacetic acid residue. This improved solubility favors a general application of the new diazonium compounds.

The following examples illustrate the invention, the parts being by weight unless otherwise stated, and the relationship of parts by weight to parts by volume being the same as that of the kilogram to the litre:

(1) 53.5 parts of finely ground 4-amino-2:5-dimethoxy-4'-nitro-azobenzene-2'-oxyacetic acid diethyl amide are suspended, while stirring well, in 900 parts by volume of hydrochloric acid of 3.9 per cent strength, and diazotised at 15–20° C. with a solution of 12.9 parts of sodium nitrite in 60 parts by volume of water. When the diazotization is complete, the solution is clarified, filtered with suction, and by mixing the clear filtrate with a solution of 10 parts of zinc chloride in 50 parts by volume of water the diazonium chloride-zinc chloride double salt is precipitated.

The product, which is isolated and dried in the usual manner, has the formula

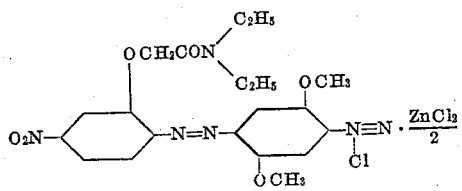

It has a solubility of 27.8 grams in one litre of water calculated on the base having a molecular weight of 431.

The comparable product, containing a methoxy group instead of the oxy acetic residue, namely the diazonium chloride-zinc chloride double salt of 4-amino-2:5:2'-trimethoxy-4'-nitro-azobenzene has a solubility of only 16 grams in one litre of water.

(2) 51.4 parts of 2-amino-5-methyl-4-oxyacetic acid diethylamide-4'-nitro-azobenzene-2'-oxyacetic acid diethylamide and 500 parts of hydrochloric acid of 20 per cent strength are mixed by stirring and diazotized in the usual manner with a solution of 10.4 parts of sodium nitrite in 50 parts of water.

After filtration, by adding to the solution obtained a solution of zinc chloride and by addition of sodium chloride the diazonium chloride-zinc chloride double salt of the base is precipitated.

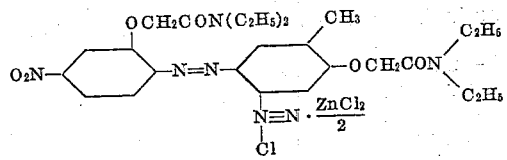

It has a solubility of 17.1 grams in one litre of water calculated on the base.

The comparable product which does not contain the oxyacetic acid diethylamide group

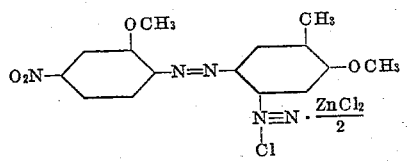

has a solubility of only 9.8 grams of the base per one litre of water.

(3) 15.9 parts of 1-amino-7-naphthol are dissolved in 500 parts of hydrochloric acid of 1.8 per cent strength and are diazotized at 0° to 5° C. with a solution of 7.3 parts of sodium nitrite in 30 parts of water.

26.7 parts of 1-amino-4-nitro-2-phenoxyacetic acid diethylamide and 7.3 parts of sodium nitrite are admixed with 50 parts of water to form a paste. This paste is brought at 0° to 5° C. into 200 parts of hydrochloric acid of 7.5 per cent strength. The diazo solution obtained hereby is filtered and combined with the diazo solution of the 1-amino-7-naphthol.

60 parts of sodium bicarbonate are added to the solution, which is stirred for a short time at a temperature of 5° C. To the solution showing an acid reaction on Congo paper, sodium chloride is being added, whereby the diazonium chloride of the following formula is precipitated:

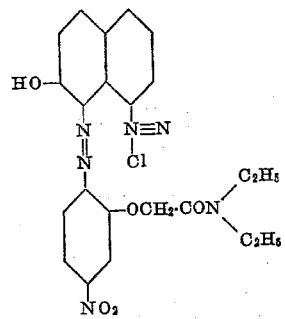

Its solubility is 13.6 grams in one litre of water, calculated on the base.

The comparable compound which does not contain the oxyacetic acid diethylamide group

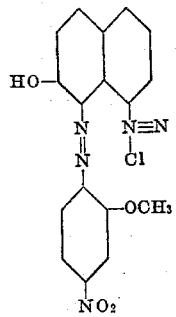

has a solubility of 2 grams of the base in one litre of water.

Since the essential feature of the invention consists in replacing the alkoxy group of the hitherto used amino-azo compounds by an oxyacetic acid residue being substituted in the carboxylic acid group by an alkylated amino group, the substitution of the compounds described herein may be varied in other directions to a considerable extent without leaving the scope of this invention.

For instance, instead of using a dialkylamino substituted oxyacetic acid residue wherein both alkyl groups are of the same constitution, one may use compounds having two different alkyl groups in the amino group. There can also be used monoalkyl amino derivatives of the oxyacetic acid substituted amino-azo compound.

Likewise, the nitro-substituted phenyl nucleus may be substituted also otherwise instead by a nitro group, for instance by alkyl, alkoxy or halogen; it may also be unsubstituted.

The aryl radical which contains the amino group and other substituents may be substituted also by further substituents, such as the ethyl or ethoxy groups or by a halogen atom, especially Cl.

The new diazonium compounds can be built up, instead of diazotizing an amino azo-compound, also by diazotizing two amino-aryl compounds corresponding to a diazo and a coupling component of such amino azo-compound so that the diazonium compound can be obtained directly from two amino substituted aryl compounds instead of first building up an amino azo-compound and then diazotizing the latter. In this manner, diazonium compounds for instance can be obtained from 1-amino-7-naphthol and 1-amino-4-nitro-2-phenoxyacetic acid diethylamide.

This invention is not restricted to the use of mineral acids in moderate concentrations. It is obvious that the same bases can be diazotized also by applying stronger concentrations of the acids. However, it is an essential advantage of the new process that the herein described new amino-azo compounds can be diazotized in much weaker concentrations of acids than the hitherto used amino-azo compounds substituted by an alkoxy group. Besides, the new diazonium compounds themselves are distinguished over the hitherto known comparable compounds by an essentially greater solubility which facilitates their application.

The present invention is based on the observation that the aforesaid properties are possessed in general by aminoazo compounds of the general formula aryl-N=N-aryl-NH$_2$ in which one or both of the aryl residues contain at least once the grouping

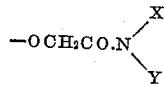

in which X represents hydrogen or an alkyl group and Y represents an alkyl group, and the aryl residues may contain further substituents. Thus, the aforesaid aminoazo compounds are more easily diazotisable and yield more easily soluble diazonium compounds than those which do not contain the grouping

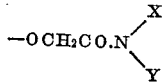

We claim:
1. Diazonium compounds of the class consisting of those having the following general formula

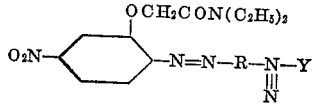

wherein R stands for an aryl radical of the group consisting of benzene and naphthalene at least one hydrogen atom of said radical being substituted by a substituent of the group consisting of —OH, —CH$_3$, —OCH$_3$, OCH$_2$CON(C$_2$H$_5$)$_2$, and Y is the radical of a mineral acid and the zinc chloride double salts of such compounds.

2. Diazonium compounds of the class consisting of those having the following general formula

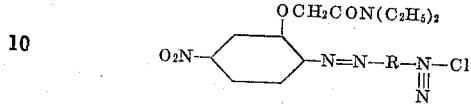

wherein R stands for an aryl radical of the group consisting of benzene and naphthalene at least one hydrogen atom of said radical being substituted by a substituent of the group consisting of —OH, —CH$_3$, —OCH$_3$, —OCH$_2$CON(C$_2$H$_5$)$_2$, and the zinc chloride double salts of such compounds.

3. A diazonium compound of the following formula:

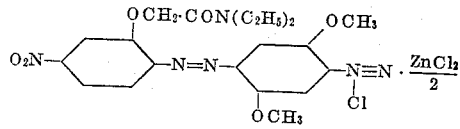

4. A diazonium compound of the following formula:

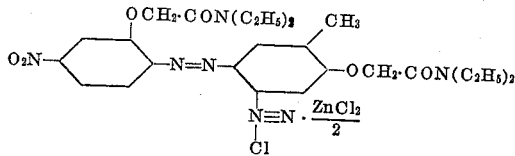

5. A diazonium compound of the following formula:

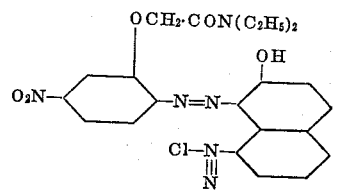

WILHELM SEIDENFADEN.
HANS ALBERT.

References Cited in the file of this patent
UNITED STATES PATENTS

| Number | Name | Date |
|---|---|---|
| 1,846,150 | Schnitzspahn | Feb. 23, 1932 |
| 1,889,298 | Schnitzspahn | Nov. 29, 1932 |
| 2,032,110 | Bonhote | Feb. 25, 1936 |